(No Model.)

M. Y. WARREN.
EDGER.

No. 536,497.   Patented Mar. 26, 1895.

WITNESSES:
Chas Nida
H. B. Hutchinson

INVENTOR
M. Y. Warren
BY Munn & Co.
ATTORNEYS.

UNITED STATES PATENT OFFICE.

MYLES Y. WARREN, OF PHILADELPHIA, PENNSYLVANIA.

EDGER.

SPECIFICATION forming part of Letters Patent No. 536,497, dated March 26, 1895.

Application filed June 16, 1894. Serial No. 514,777. (No model.)

*To all whom it may concern:*

Be it known that I, MYLES Y. WARREN, of Germantown, Philadelphia, in the county of Philadelphia and State of Pennsylvania, have invented a new and Improved Edger, of which the following is a full, clear, and exact description.

My invention relates to improvements in that class of devices which are used for trimming the hedges and the edges of lawns; and the object of my invention is to produce a very simple, cheap and light machine of this class, which may be pushed rapidly along the edge of a lawn or the side of a hedge, and which when so moved will quickly and nicely trim the hedge or the grass, as the case may be.

To these ends my invention consists of certain features of construction and combinations of parts which will be hereinafter described and claimed.

Reference is to be had to the accompanying drawings, forming a part of this specification, in which similar figures of reference indicate corresponding parts in both the views.

Figure 1:
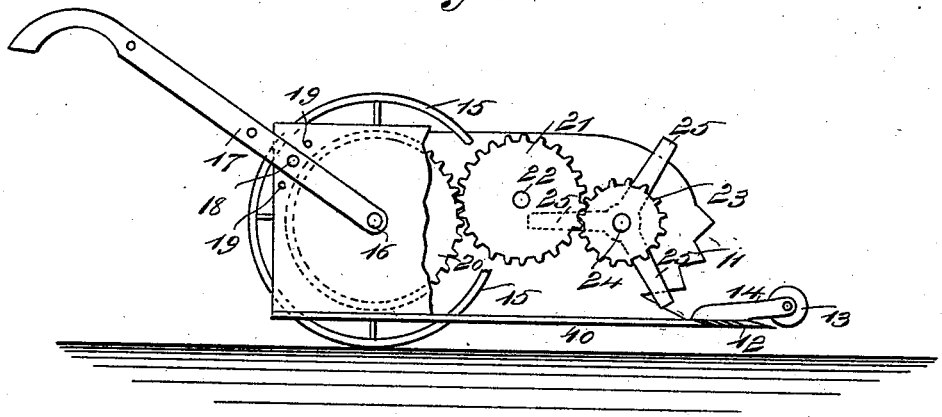
Figure 2:
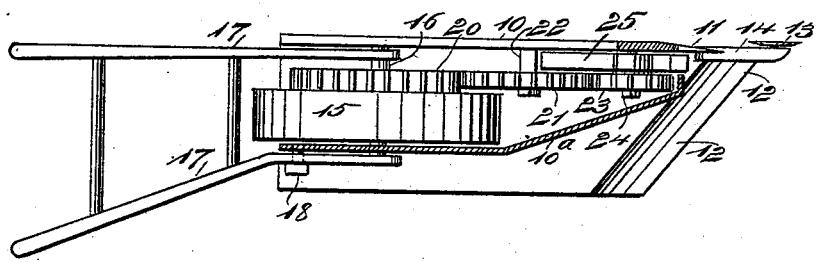

Figure 1 is a broken side elevation, partly in section, of the machine embodying my invention; and Fig. 2 is a sectional plan of the machine.

The machine is provided with a box or case 10 in which the gear is held, this box being inclined on one side and near the front end, as shown at 10ª in Fig. 2, so that the severed grass, twigs, &c., will be naturally thrown to one side of the machine. The straight side of the box terminates at its front end in notched blades or teeth 11, which are sharp on their upper edges so that when material is forced against them, as hereinafter described, it will be cut.

The bottom of the box is beveled at the front end and inclined to one side, as shown at 12, and at the extremity of the box bottom is a circular cutter 13 which is journaled on a suitable support 14 and is adapted to cut its way along the edge of a lawn or through any material against which it is pushed.

The box 10 is carried by a main driving wheel 15 which projects through the box bottom, as shown in Fig. 1, and on the axle 16 of the wheel is pivoted the handle 17 of the machine which is substantially like a plow handle, but may be of any approved kind, and it projects upward and rearward from the box so that by it the box may be easily pushed. The handle should have means for adjusting its height, and as illustrated this is accomplished by means of a pin 18 which may be fastened in either of the holes 19 in the box and which projects through holes in the handle. Any other suitable means, however, may be employed for this purpose.

On the axle 16 is carried a cog wheel 20 which meshes with a second cog wheel 21 in advance of it, this latter wheel being journaled on a stud 22, the latter cog wheel driving a third cog wheel 23 which is secured to a shaft 24, this being journaled transversely near the front end of the box 10, and to the shaft are secured radial arms 25, three being preferably employed, although a greater or less number may be used, and the arms turn close to the blades or teeth 11 and force downward, against the teeth, any twigs, limbs, or grass in their path, and the said material in thus cut off.

The machine is used by pushing it along the edge of the lawn to be trimmed or opposite the side of the hedge to be trimmed, and the height of the cutter 13 from the ground, may be regulated by means of the handle 17, and as the machine is pushed the wheel 15 revolves and imparts a rotary motion to the arms 25 which, by brushing the stuff to be trimmed, over the blades, causes it to cut as specified, while the cutter 13 is particularly adapted to make the edge of a lawn perfectly true and even.

Having thus described my invention, I claim as new and desire to secure by Letters Patent—

1. A machine of the kind described, having one side terminating in a vertical toothed blade, means located on the inner face of the said side for pressing the twigs, grass &c., against the teeth, an inclined scraper located at the front of the machine, and a rotary cutter located in advance of the blades, whereby the edge of the lawn is made true and even, the side trimmed, and the twigs, grass &c., scraped from the edge of the walk and thrown to one side of the machine, substantially as described.

2. A machine of the kind described, comprising a wheel supported frame, having one side terminating at its front in a series of vertical blades, the opposite side of said frame near the front being inclined toward the straight side, and the bottom of said frame extending beyond the inclined side and terminating at its front in an inclined scraper, and means operated by the driving wheel for pressing the twigs, grass &c., against the blades, substantially as described.

3. A machine of the kind described, comprising a wheel supported frame, one side of which is straight and provided with blades at its front edge, the opposite side near the front being inclined toward the straight side, and the bottom of said frame extending outward beyond the inclined side and provided at its front with an inclined scraper, means located on the inner face of the straight side of the frame for pressing the twigs, grass, &c., against the said blades, and a circular cutter in advance of the blades, substantially as described.

MYLES Y. WARREN.

Witnesses:
  JOHN Y. WARREN,
  SAMUEL R. WARREN.